US011375725B1

(12) United States Patent
Morales

(10) Patent No.: US 11,375,725 B1
(45) Date of Patent: Jul. 5, 2022

(54) ROTISSERIE SMOKER

(71) Applicant: Vladimir Morales, Miami Gardens, FL (US)

(72) Inventor: Vladimir Morales, Miami Gardens, FL (US)

( * ) Notice: Subject to any disclaimer, the term of this patent is extended or adjusted under 35 U.S.C. 154(b) by 0 days.

(21) Appl. No.: 17/669,286

(22) Filed: Feb. 10, 2022

(51) Int. Cl.
| | |
|---|---|
| *A47J 37/07* | (2006.01) |
| *A47J 33/00* | (2006.01) |
| *A23B 4/052* | (2006.01) |
| *F24C 3/12* | (2006.01) |
| *A47J 37/04* | (2006.01) |
| *F24C 3/08* | (2006.01) |

(52) U.S. Cl.
CPC ............. *A23B 4/052* (2013.01); *A47J 37/041* (2013.01); *F24C 3/087* (2013.01); *F24C 3/128* (2013.01); *A23V 2002/00* (2013.01)

(58) Field of Classification Search
CPC ......... A47J 37/0623–0647; A47J 37/07–0713; A47J 37/0718–0727; A47J 37/0731–0736; A47J 37/074; A47J 33/00; F24B 13/00; F24B 15/00; F24B 7/00
See application file for complete search history.

(56) References Cited

U.S. PATENT DOCUMENTS

| | | | | |
|---|---|---|---|---|
| 5,711,209 | A * | 1/1998 | Guines | F24B 1/207 126/41 R |
| 7,861,705 | B2 * | 1/2011 | Hulsey | A47J 37/07 432/177 |
| 8,490,614 | B1 * | 7/2013 | Gregory | A47J 37/0754 126/41 R |
| 11,202,532 | B2 * | 12/2021 | Dahle | A47J 37/0786 |
| 2008/0066733 | A1 * | 3/2008 | Wahl | A47J 37/0704 126/41 R |
| 2015/0320259 | A1 * | 11/2015 | Tucker | F24B 13/04 126/10 |
| 2019/0313848 | A1 * | 10/2019 | Sanchez | A47J 37/0704 |
| 2020/0158337 | A1 * | 5/2020 | Baker | A47J 37/0722 |
| 2020/0240643 | A1 * | 7/2020 | Donnelly | A47J 37/0704 |

\* cited by examiner

*Primary Examiner* — Michael A Laflame, Jr.
(74) *Attorney, Agent, or Firm* — Christopher J. Vandam, PA; Chris Van Dam

(57) ABSTRACT

A food smoker oven with a front section and a rear section. The rear section is a drawer that contains smoldering organic material. The front section includes a rotisserie for holding the food being prepared. A gas burner separates the front section and the rear section. The gas burner provides a curtain of combustion gasses between the smoker drawer and the rotisserie rod that mixes with the smoke from the smoldering organic material. The food on the rotisserie is forward of the burner so that the burner does not provide heat directly underneath the food.

10 Claims, 4 Drawing Sheets

ROTISSERIE SMOKER

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to cooking grills, and more particularly, to an improved device and method of use to cook, hold and smoke food products.

2. Description of Related Art Including Information Disclosed Under 37 CFR 1.97 and 37 CFR 1.98

Several designs for grills have been designed in the past. None of them, however, include an insulated, temperature controlled case containing a rotisserie spit in a front segment separated by a burner producing a curtain of combustion byproducts that mix with smoke from smoldering organic material produced in a rear area.

Applicant believes that the closest reference corresponds to commercially available smoker-grill combinations. However, it differs from the present invention because the prior art devices either smoke food with heat under the food or cold smoke or grills that heat from below the food. In contrast, the present device provides for a flame behind the food that mixes with the organic smoke source so that the combustion products and smoke mix adjacent to the food and not under it.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide a heated smoker that does not heat the food from below.

It is another object of this invention to provide a burner behind the food that combines a curtain of gas combustion byproducts with the smoke generated in a rear section of the oven box.

It is still another object of the present invention to provide a smoker with a window allowing visualization of the food as it is being cooked and smoked.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
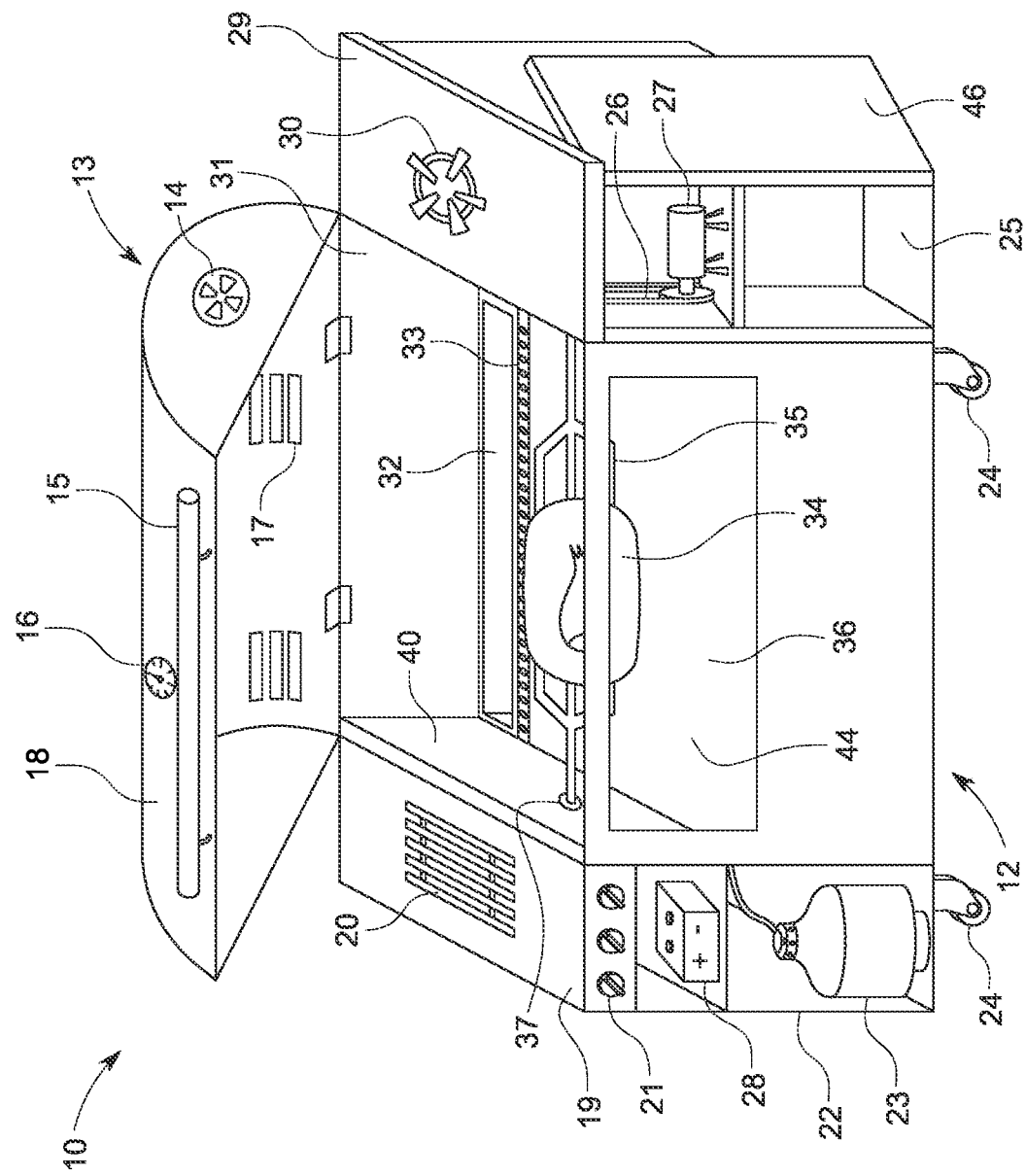
FIG. 1 shows an example of a rotisserie smoker with an open lid assembly.
Figure 2:
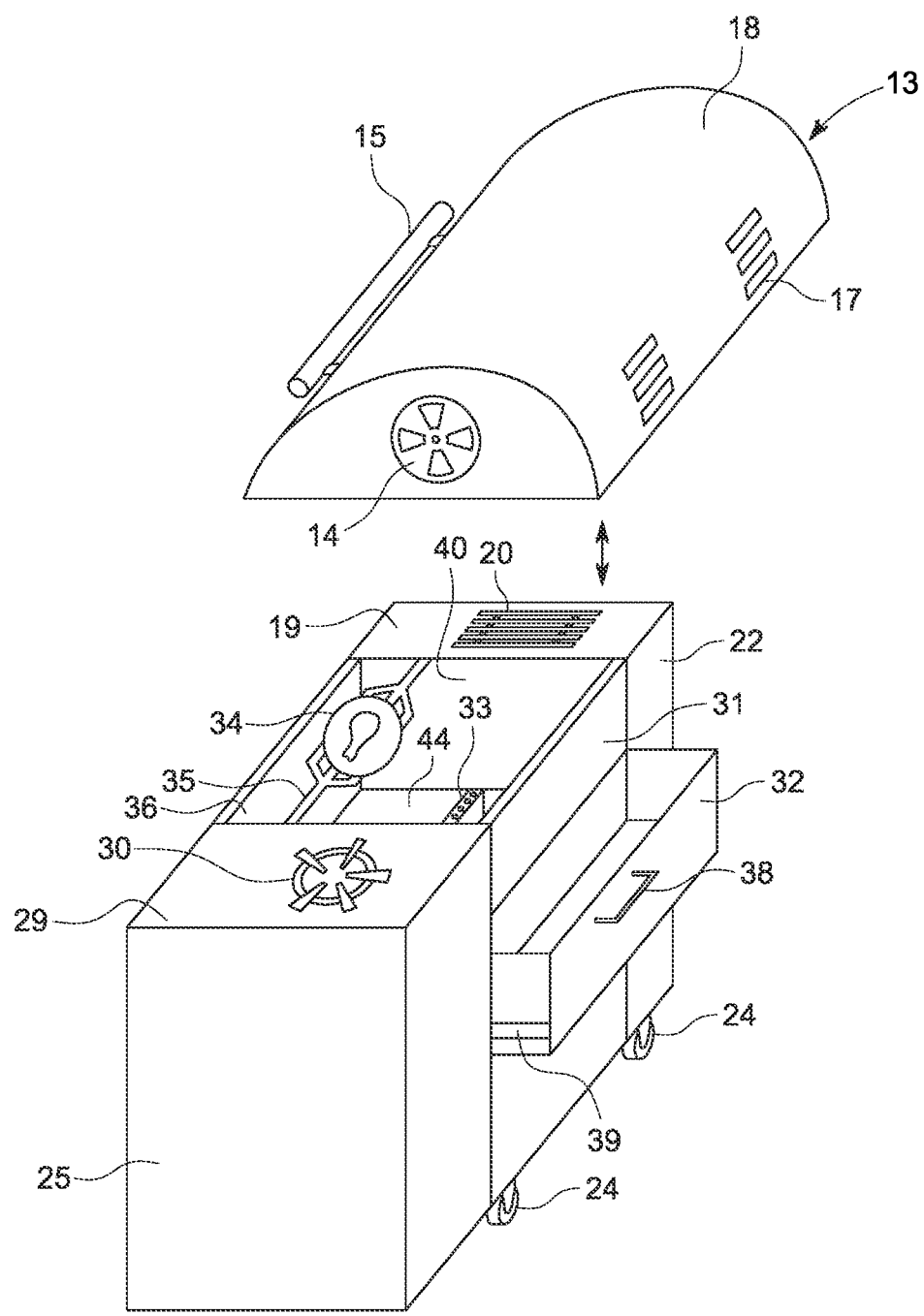
FIG. 2 shows an exploded perspective view demonstrating a rear side of the rotisserie smoker.
Figure 3:
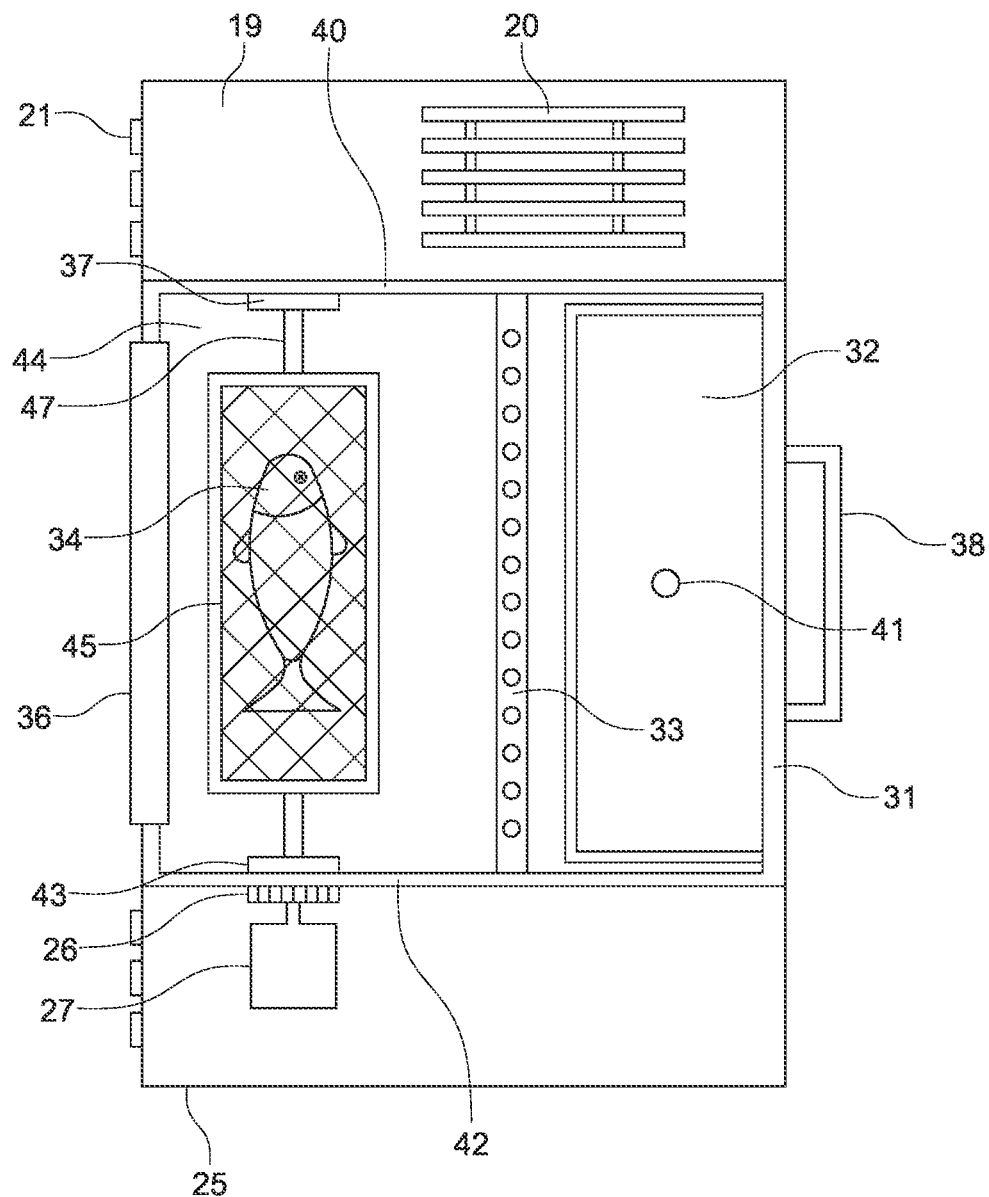
FIG. 3 shows a top plan view of a rotisserie smoker with the right side table removed.

While this invention may be embodied in many different forms, there are described in detail herein, specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the smoker, the rotisserie smoker, the rotisserie, the rotisserie oven, the machine or other similar terms. These terms may be used interchangeably as context requires, and from use, the intent becomes apparent. The masculine can sometimes refer to the feminine and neuter and vice versa. The plural may include the singular and singular the plural as appropriate from a fair and reasonable interpretation in the situation and context.

Referring now to the drawings, where the present invention is generally referred to with numeral 10, it can be observed that it basically includes a base assembly 12, a lid assembly 13, a vent 14, a handle 15, a thermometer 16, vents 17, a cover 18, a table 19, a grill 20, controls 21, a cabinet 22, a tank 23, wheels 24, a cabinet 25, a belt 26, a motor 27, a battery 28, a table 29, a burner 30, a back 31, a drawer 32, a burner 33, a food 34, a rotisserie rod 35, a window 36, a bearing 37, a handle 38, a slide 39, a side 40, an igniter 41, a side 42, a bearing 43, a floor 44, a basket 45, a door 46, a rod 47, apertures 48, apertures 49, flames 50, smoke 51, an organic material 52, a wall 53, a bottom 54, a side 55 and a gas curtain 56.

Looking now at FIG. 1, an example of a rotisserie smoker is shown. Generally, a base assembly 12 is connected to a lid assembly 13 with hinges so that the interior of the base assembly 12 is accessible from the front. A cabinet 22 may be provided on the left side of the base assembly 12 and a cabinet 25 may be provided on a right side of the base assembly 12.

Inside the cabinet 22 is sufficient space for a tank 23 of fuel and a battery 28 to provide electrical power to the rotisserie smoker. The tank 23 and battery 28 are examples that may be present in a more portable version of a rotisserie smoker. Alternatively, a fuel supply may be hard plumbed into the device as well as an alternating current power source to power the device.

On the top of cabinet 22 is a table 19 surface. A grill 20 may be optionally present on the table 19 surface. The grill 22 provides a direct flame cooking surface. A cover may also be provided to enclose the upper surface of the grill 22 to protect the grill 20 during storage and to provide a larger work surface when the grill 20 is not in use.

Controls 21 are provided on the cabinet 22 to control the various features of the rotisserie smoker. One of the controls 21 may be electrically connected to the motor 27 that turns the rotisserie rod 35. This control may turn the motor 27 on and off as well as control the speed of rotation of the rotisserie rod 35. Another control 21 may be provided to regulate the burner 33 by controlling the flow of gas from the tank 23 permitted to be delivered to the burner 33.

Another of the controls 21 may ignite and control gas provided to the grill 20 or burner 30, independently. Another control 21 may be used to activate the igniter 41 in the bottom of the drawer 32. The igniter 41 control 21 may intermittently activate the igniter 41 or act as a countdown timer that limits how long the igniter 41 heats. Another of the controls 21 may regulate the temperature inside the rotisserie smoker by selectively opening and closing the motorized vent 14 or adjusting the flow of gas to the burner 33.

A cabinet 25 may also be provided to the side of the rotisserie cabinet and the base assembly 12. The cabinet 25 may contain storage and a motor 27 that is operatively connected to the rotisserie rod 35 by a belt 26. The motor 27 rotates the belt 26, which in turn rotates the rotisserie rod 35 about bearing 37 and bearing 43. The food 34 is thereby mechanically rotated throughout the smoking process.

An analogous structure to the motor 27 and belt 26 combination may also be equally effective. For example, the motor 27 may directly drive the rotisserie rod (or spit) 35, without the use of a belt 26. Similarly, a chain, gearing or other known mechanical structure may be employed to connect to the motor 27 to the rotisserie rod 35.

The rotisserie rod 35, also known as a spit, is supported at one end with a bearing 37 and at the opposing and at bearing 43. The rotisserie rod 35, or the basket 45, is supported between the bearing 37 and 43 and is allowed to readily rotate with even a heavy portion of food 34. The basket 45 and rotisserie rod 35 are intended to be equivalents in claim construction.

Both the cabinet 22 and cabinet 25 may each be provided with a door 46, such as the door 46 attached to cabinet 25, as shown in FIG. 1. The door 46 may be provided to improve the aesthetics of the smoker rotisserie as well as provide secure storage for the components contained therein.

Cabinet 25 may be topped with a table 29 surface. The table 29 may optionally include a burner 30. The burner 30 is provided, similar to a kitchen range where a pot or pan may be used over direct heat provided by the burner 30. Both the burner 30 and the grill 20, as well as the primary burner 33, may be powered by gas contained in the tank 23 or other gas source discussed above.

The burner may include a cover or lid to protect the burner. If a cover for the burner 30 is in place, the entire surface of the table 29 may be used for food preparation or other use ancillary to the rotisserie smoker's operation.

The lid assembly 13 is comprised of, among other elements, a cover 18 hinged to the back 31. A handle 15 may be provided opposite the hinges to allow easy opening and closing of the cover 18 without burning the operator's hand. A thermometer 16 may be provided in the lid assembly to visually indicate the interior temperature of the smoker rotisserie. The thermometer 16 may provide temperature information to the controls 21 to regulate the output of the burner 33 or vents 14 or 17.

Vents 17 may be provided to allow release of some excess smoke and allow fresh air to enter. The vents 17 may optionally be closed and opened with a louver. Vent 14 may also be provided to allow the egress of smoke and the ingress of fresh air into the rotisserie smoker. Any of the events 14 or 17 may be electronically controlled to interact with the controls 21 to regulate the interior temperature of the smoker rotisserie. A servo may be provided to the vent 14 or 17 to open and close apertures through the lid assembly 13.

Generally, while the rotisserie smoker is in operation, the cover 18 is closed to allow the circulation of smoke generated in the drawer 32 around the food 34. The lid assembly 13 also acts to keep heat inside the smoker body during use. Optionally, the cover 18 and the rest of the oven box may be insulated to better inhibit heat loss.

The main smoker box is surrounded by a side 40 and side 42 on the left and right, a floor 44 on the bottom and a back 31. Each of these side 40, side 42, back 31 and floor 44 may be insulated to help regulate heat. The top edge of the side 40 and side 42 preferably mates well with the bottom edge of the cover 18 to reduce smoke leakage and heat loss.

The front of the rotisserie smoker includes a large window 36. The window is provided to view the food 34 rotating on the rotisserie rod 35 during the smoking process. Flames emanating from the burner 33 also add a heightened aesthetic. The window 36 may be insulated to improve heat retention.

Generally, the window 36 is made of a heat resistant clear material, such as a fire rated glass panel. However, because the flame from the burner 36 is spatially separated from the window 36, the window 36 does not experience as substantial a temperature as it would experience by direct heat. This allows the window 36 to be made of a more common glass material. It should be appreciated, however, that any clear material allowing viewing of the contents of the smoke rotisserie that also withstands the temperature generated by the device, may be suitable for a window 36.

An important purpose of the rotisserie smoker is to turn the food 34 where it is visible in front of the window 36 and where the food 34 is held a way from the direct heat over the burner 33. Depending on the size of the food 34 that the smoker rotisserie is dimensioned to use, the area forward of the burner 33 is approximately two thirds of the floor area and the drawer 32 is approximately the rearmost one third. The burner 33 generally separates the rear drawer 32 from the forward rotisserie area.

The drawer 32 is accessible from the back 31 of the rotisserie smoker. The drawer is provided with drawer slides 39 and a handle 38 to easily withdraw and replace the door 32. The drawer 32 has an open top exposed to the interior of the oven box. The four walls and bottom of the drawer 32 are preferably made of a heat resistant material such as stainless steel or other metallic alloy.

The drawer 32 is adapted and dimensioned to accept a volume of organic material that will be burned or smoldered to generate smoke inside the main chamber of the rotisserie smoker. When the drawer 32 is fully inserted, the contents of the drawer 32 are essentially positioned in the approximately rear one third of the rotisserie smoker and thereby delivers the smoke to the interior of the oven box through, and mixing with, the combustion gas curtain provided by the burner 33.

The drawer 32 may be opened and closed to add new organic material and remove spent organic material. Generally, the drawer 32 is fully inserted into the rotisserie smoker during the smoking operation. However, for some techniques it may be advantageous to have the drawer 32 partially opened to allow fresh air to be drawn in over the smoking, organic material to improve combustion and airflow.

Generally, the organic material used to smoke and smolder is similar to that used in other smokers. For example, woodchips, pellets, charcoal, cakes or bricks may be combusted to generate the smoke. Depending on the chef's selection, a single or multiple smoking organic materials may be used in a recipe.

An igniter 41 may be provided in the bottom surface of the drawer 32. The igniter 41 may be electrically powered by the battery 28 and controlled by the controls 21 to selectively heat and ignite the organic material being combusted to generate smoke. An electrical igniter 41 has advantages in that no petroleum accelerant is used to start the organic material to smoke that could affect the composition of the smoke and the flavor imparted onto the food.

The organic material placed into the drawer 32 may also be ignited by alternate means. For example, charcoal may be first ignited in the bottom of the drawer and then organic material placed on top of the burning charcoal to generate combustion and a smoke. Alternatively, the organic material in the drawer 32 may be directly ignited manually by a flame. For example, a lighter or match may be used to initiate the combustion manually in the drawer 32 when open. As the combustion starts, the drawer 32 may be closed.

The organic material in the drawer 32 may also be ignited with a chemical accelerant, such as a lighter fluid. In this procedure, organic material is placed into the drawer 32 and lighter fluid is sprayed on a portion of the organic material. A match or lighter ignites the organic material. As the lighter fluid burns off, the drawer 32 may be closed as the organic material combusts.

It should be appreciated that the term organic material includes generally any consumable material that will burn, smoke and smolder in the drawer 32 and provide a source of smoke that flows into the rotisserie chamber. Generally, organic material, once ignited will generate enough heat to continue the combustion process and consume the majority of the organic material. Common organic material that may be effectively used has included hardwood woodchips such as hickory, cherry or mesquite. Other smoke producing organic materials may be combusted at the chef's discretion.

An important purpose of the rotisserie smoker is to turn the food 34 where it is visible in front of the window 36 and where the food 34 is held away from the direct heat over the burner 33. Depending on the size of the food 34 that the smoker rotisserie is dimensioned to use, the area forward of the burner 33 is approximately two thirds of the floor area and the drawer 32 is approximately the rearmost one third. The burner 33 generally is the dividing line between the rear drawer 32 from the forward rotisserie area. The food on the rotisserie is forward of the burner 33 and is not directly above the burner 33.

The burner 33 is provided adjacent to the forward wall of the drawer 32. An important aspect of the invention is that the burner 33 is behind, and not underneath the food 34 being smoked. The food 34 is not exposed to direct heat from the flame produced by the burner 33. The burner 33 is behind the food and adjacent to the drawer 32 containing the organic smoking material. The burner 33 may act to heat and ignite organic material contained within the drawer 32.

The position of the burner 33 is important for the improved performance of the rotisserie smoker. As the organic materials smolder in the drawer 32, the curtain of combustion gasses from the flames from the burner 33 mix with the rising smoke and combine with the combustion byproducts of the gas fuel.

For example, if propane is the gas provided to the burner 33, the byproducts of combustion is carbon dioxide and water. The smoke mixing with carbon dioxide and water creates an improved, amended smoke combination. This improved smoke is smoother and is circulated around the interior of the smoke a rotisserie by convection.

The chemical equation of the combustion of propane, a commonly available fuel used in the rotisserie, is:

$$C3H8 + 5O2 \rightarrow 3CO2 + 4H2O + heat$$

For each molecule of propane gas burned in ambient oxygen, three molecules of carbon dioxide and four molecules of water are produced in addition to heat. The heat gives rise to convection and the resulting water and carbon dioxide blend with the smoke emitting from the smoldering organic material in the drawer 32. It is the combination of smoke into the curtain of combustion byproducts that create an improved smoke that bathes the food on the rotisserie. It is not plain smoke from the organic material but an improved flavored gas produced by mixing CO2, water and organic smoke.

Other gaseous fuels may also be used in the rotisserie smoker. For example, liquid natural gas is comprised of a blend of short-chain hydrocarbons that, when burned, produce carbon dioxide and water in stoichiometric ratios similar to that of propane sufficient to create the improved smoke.

Heat is provided to the interior of the rotisserie smoker both by the smoldering organic material in the drawer 32 and the gas burned in the burner 33. Because the valve between the tank 23 and burner 33 is easy to adjust, the energy and heat produced by the burner 33 is easier to control than the heat produced by the smoldering organic material in the drawer 32.

Although the organic material in the drawer 32 provides substantial heat, the precise temperature of the interior of the smoker rotisserie is controlled by the amount of supplemental heat provided by the burner 33 burning propane, or other flammable gas. Control of the vents can also adjust the temperature.

Because the heat generated by the smoke or rotisserie is not under the food 34, but is instead behind the food, the rotisserie smoker acts similar to an oven by using indirect heat. Therefore, with a very clean burning organic, such as charcoal, combined with the delicate control provided by the valve-controlled burner 33, many types of food 34 may be cooked in the device with anywhere in a range from virtually no smoke to large amounts smoke.

As an example, when initiating use of the smoker rotisserie, the user may a first install the food on the rotisserie rod 35 or basket 45 and the cover 18 is closed. Then, the flame is ignited on the burner 33 and allows the interior of the rotisserie smoker to achieve a predetermined temperature. The drawer 32 is then opened and charcoal or wood is placed inside. This organic material in the drawer is then ignited to a flame or smolder. The drawer 32 is then closed and the smoke circulates inside the main body of the rotisserie smoker after mixing with the propane byproduct curtain.

Because the drawer 32 is openable without opening the main cover 18, additional organic material can be added to the drawer 32 during the smoking session. Essentially, the drawer 32 may be quickly cracked open and a handful of wood chips can be added without substantial heat loss from the inside of the rotisserie.

Figure 4:
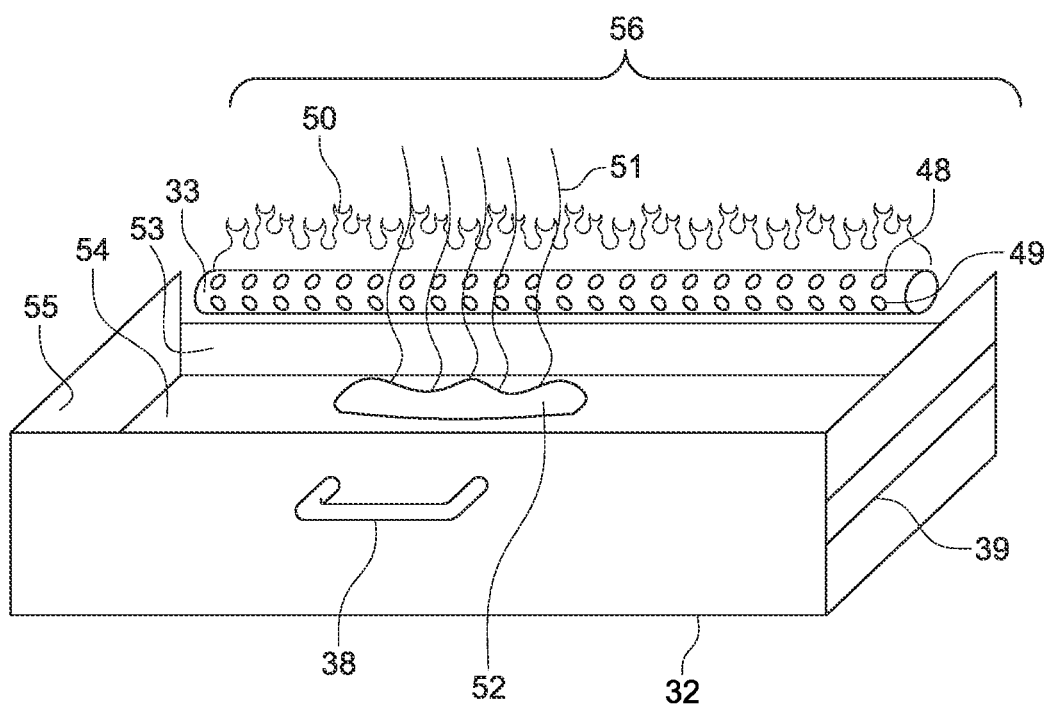
FIG. 4 shows a partial perspective view of a burner and a rear drawer assembly.

Looking at FIG. 4, a version of the drawer assembly 32 and burner 33 is shown. The drawer 32 includes a slide 39 on each side of the drawer 32 to withdraw and close the drawer 32 from within the body of the device. The drawer 32 generally includes a bottom 54 that is bounded by sides 55 and a wall 53.

The organic material 52 that is used to smolder and create the smoke 51 is placed between of the sides 55, on the bottom 54 of the drawer 32. In FIG. 4, the burner 33 is adapted to include flame producing apertures 48 on an upper edge of the burner 33 and flame producing apertures 49 on a rearward facing surface of the burner 33. The apertures 49 facing rearward are used to direct flame 50 into the interior of the drawer 33 in order to ignite and smolder the organic material 52.

By having the apertures 49 of the burner 33 direct heat and flame toward the organic material 52 inside the drawer 32, additional ignition sources, discussed above, may not be necessary. It should also be appreciated that the number and dimensions of the apertures 49 may be less than that of apertures 48. This creates a smaller flame directed toward the organic material 52 because the organic material 52 preferably smolders to produce maximum smoke rather than a high heat efficient burn. In one example, there is a single aperture 49 on the burner 33 facing the organic material 52 to provide essentially a small pilot light to keep the organic material 52 ignited and smoking.

The flames 50 emanating from both the apertures 48 and 49 are partially raised by convection forces similar to the smoke 51 that is also raised by convection forces. The combination of the flames 50 and smoke 51 combined together in a gas curtain 56 of combined combustion byproducts and smoke 51. This gas curtain 56 is then raised by convection into the interior of the rotisserie smoker where the gas curtain 56 circulates the smoke 51 combined with the gas burner 33 combustion byproducts around the food 34.

An important version of the invention can be fairly described as a rotisserie smoker having an oven box with a hinged lid. The interior of the oven box has a front section, near where the operator stands, and a rear section, closer to the back side of the rotisserie smoker. The rear section of the oven box is comprised of a smoker drawer. The drawer pulls open from a rear side of the oven box to add organic material for smoking. Generally, the box is closed during operation of the rotisserie smoker but may be partially opened to draw in fresh, ambient air. The smoker drawer is open on an upper side and, when inserted into the oven box, is exposed to the interior of the oven box. This allows any smoldering material in the drawer to mix inside the interior of the oven box when in use. The front section of the interior of the oven box has a rotisserie rod spanning across the interior width of the own box. The rotisserie rod is positioned so that food may be placed on the rotisserie rod and functionally rotate within the front section of the oven box. The oven box is the interior volume of the rotisserie smoker where the food, burner and other components are located. A gas burner spans the interior width of the oven and separates the front section from the rear section. Essentially, the gas burner is on the forward edge of the smoker drawer and is not a part of the front section. Any food on the rotisserie rod is entirely in the front section and is forward of the gas burner so that the gas burner is not under the food. In this way, the food is not directly grilled by the gas burner. Organic material, such as woodchips or coal, is placed in the drawer and is ignited to smolder, thereby producing a smoke. When the organic material is smoldering in the smoker drawer and the burner is ignited, the combustion byproducts form a curtain that mixes with the smoke of the smoldering organic material. The heat from the burner and the smoldering material produce a convective effect that raises and mixes the smoke inside the interior of the oven box. Optionally, a window is provided in the front of the oven box to view the food turning on the rotisserie rod. Optionally, an electric heater or igniter is provided in the bottom of the smoker drawer configured to ignite, heat or smolder the organic material. Optionally, a burner and/or a grill are affixed to an exterior side of the oven box. Optionally, a thermostat is provided to control the temperature inside the oven box by opening and closing vents. Optionally, a thermostat is also provided to control the temperature inside of the oven box by regulating the amount of gas provided to the burner for combustion.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A rotisserie smoker comprised of an oven box with a hinged lid;
   an interior of the oven box has a front section and a rear section;
   the rear section of the oven box is comprised of a smoker drawer;
   the smoker drawer opens from a rear exterior side of the oven box;
   an interior of the smoker drawer is exposed to the interior of the oven box when in a closed configuration;

the front section of the interior of the oven box has an operable rotisserie rod spanning across an interior width of the oven box;

a gas burner spans the interior width of the oven box disposed between the front section and the rear section;

a food on the rotisserie rod is entirely in the front section configured that the gas burner is behind and not under the food;

the smoker drawer contains a smoldering organic material producing a smoke;

the burner ignites a supplied gas and produces a curtain of a combustion byproduct that convectively mixes with the smoke and circulates inside the oven box.

2. The rotisserie smoker in claim 1, further characterized in that a window is provided on a front surface of the oven box configured to view the food on the rotisserie rod.

3. The rotisserie smoker in claim 1, further characterized in that an electric heater is provided in a bottom of the smoker drawer configured to heat the smoldering organic material.

4. The rotisserie smoker in claim 2, further characterized in that an electric heater is provided in a bottom of the smoker drawer configured to heat the smoldering organic material.

5. The rotisserie smoker in claim 4, further characterized in that a grill and a burner are affixed to an exterior side of the oven box.

6. The rotisserie smoker in claim 5, further characterized in that a thermostat is provided to control the temperature of the oven box by opening or closing a vent.

7. The rotisserie smoker in claim 5, further characterized in that a thermostat is provided to control the temperature of the oven box by regulating the amount of gas provided to the burner.

8. The rotisserie smoker in claim 4, further characterized in that the oven box is insulated.

9. The rotisserie smoker in claim 1, further characterized in that the burner includes at least one aperture directed toward the interior of the smoker drawer that heats the organic material.

10. The rotisserie smoker in claim 7, further characterized in that the burner includes at least one aperture directed toward the interior of the smoker drawer that heats the organic material.

\* \* \* \* \*